(No Model.)

E. E. VENABLE.
BRIDLE.

No. 250,019.    Patented Nov. 22, 1881.

Attests
H. V. Buckley
John Roberts

Inventor
E. E. Venable
per George E. Buckley
Atty.

UNITED STATES PATENT OFFICE.

EZRA E. VENABLE, OF MOORESTOWN, NEW JERSEY, ASSIGNOR TO HIMSELF AND CHARLES ZANE, OF PHILADELPHIA, PENNSYLVANIA.

BRIDLE.

SPECIFICATION forming part of Letters Patent No. 250,019, dated November 22, 1881.

Application filed August 30, 1881. (No model.)

*To all whom it may concern:*

Be it known that I, EZRA E. VENABLE, of Moorestown, Burlington county, State of New Jersey, have invented a new and useful Improvement in Bridles for Horses' Heads; and I do hereby declare the following to be a full and exact description of the same, reference being had to the annexed drawings, making part hereof.

The nature of my invention will appear from the following specification and claim.

Figure 1:
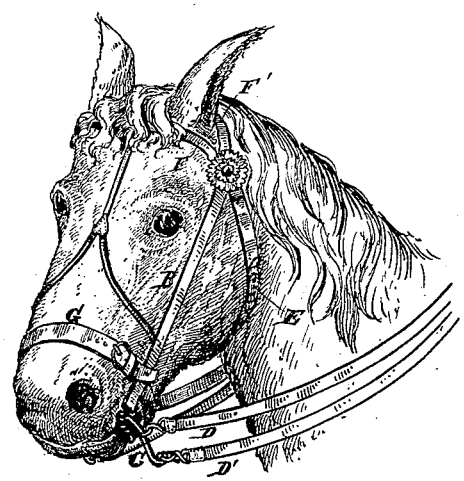
Figure 2:
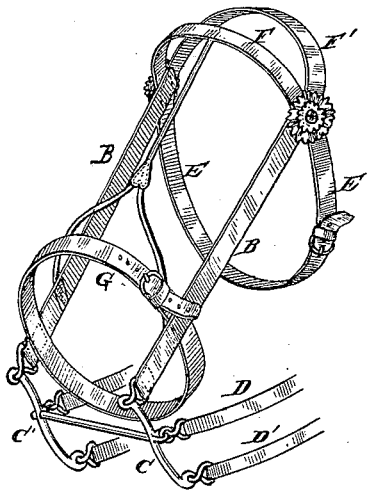

In the drawings, Figure 1 is a view of a horse's head with harness having my invention attached; Fig. 2, a view of the head-bridle containing my invention.

B B are the vertical cheek-straps. C is the curb-bit. D D' are the reins of the bridle, which are, of course, connected with the curb. F is the strap which passes around the horse's forehead, as in an ordinary bridle, and secured at each end to the upper part of the cheek-straps. F' is a continuation of the cheek-straps, passing over the top of the head. G is a strap, containing a buckle to tighten or loosen it, which passes completely around the horse's jaw a short distance above the curb or bit. The latter strap is fastened to the cheek-strap on each side by any suitable device, such as riveting or lacing, and is designed to be made just tight enough to prevent the horse from opening his jaws to throw the bit back into his molar teeth—in other words, to prevent him doing what is technically called "taking the bit in his teeth." This strap may be passed over the cheek-straps, but I prefer in practice to pass it beneath. A supplemental supporting-strap to hold up the upper part of strap G may be passed from the latter to the strap F. E is the ordinary throat-strap.

The object of my invention, which is centered in the strap G, is to prevent the horse from seizing the bit in his teeth, and so becoming uncontrollable by the rider or driver, as the case may be.

What I claim as new is—

The strap G, which encircles the horse's nose and chin, provided with a buckle-fastening, the cheek-straps B B, secured to said strap G, and extended downward beyond this strap, and the curb-bit attached to the extended ends of the cheek-straps, all combined in the manner and for the purpose described.

EZRA E. VENABLE.

Witnesses:
  H. V. BUCKLEY,
  WM. H. CARSON.